United States Patent
Fuchs (10) Patent No.: US 11,599,948 B2
(45) Date of Patent: *Mar. 7, 2023

(54) DETERMINATION AND DISPLAY OF DRIVING RISK

(71) Applicant: Scope Technologies Holdings Limited, Tortola (VG)

(72) Inventor: Gil Emanuel Fuchs, Nes Tziona (IL)

(73) Assignee: Scope Technologies Holdings Limited, Tortola (VG)

( * ) Notice: Subject to any disclaimer, the term of this patent is extended or adjusted under 35 U.S.C. 154(b) by 359 days.

This patent is subject to a terminal disclaimer.

(21) Appl. No.: 16/843,757

(22) Filed: Apr. 8, 2020

(65) Prior Publication Data

US 2020/0234382 A1    Jul. 23, 2020

Related U.S. Application Data

(63) Continuation of application No. 14/827,276, filed on Aug. 15, 2015, now Pat. No. 10,621,670.

(Continued)

(51) Int. Cl.
- *G06Q 40/08*    (2012.01)
- *G01C 21/36*    (2006.01)
- *G01C 21/34*    (2006.01)

(52) U.S. Cl.
CPC ......... *G06Q 40/08* (2013.01); *G01C 21/3697* (2013.01); *G01C 21/3461* (2013.01)

(58) Field of Classification Search
CPC . G06Q 40/08; G01C 21/3697; G01C 21/3461

(Continued)

(56) References Cited

U.S. PATENT DOCUMENTS

| 4,992,943 A * | 2/1991 | McCracken | G07C 5/085 |
| | | | 701/33.9 |
| 5,146,219 A * | 9/1992 | Zechnall | G08G 1/096725 |
| | | | 701/1 |

(Continued)

FOREIGN PATENT DOCUMENTS

| EP | 2795562 A1 | 10/2014 | |
| WO | WO-2011057217 A2 * | 5/2011 | ............. G06Q 40/00 |
| WO | 2014207558 A2 | 12/2014 | |

OTHER PUBLICATIONS

Title: Intelligent Driving Diagnosis System Applied to Drivers Modeling and High Risk Area Identification. Authors: Christian G. Quintero M et al. Published: 2012 IEEE International Conference on Vehicle Electronics and Safety Date: Jul. 24-27, 2012 (Year: 2012).*

(Continued)

*Primary Examiner* — Christopher Bridges
*Assistant Examiner* — Yongsik Park
(74) *Attorney, Agent, or Firm* — Downs Rachlin Martin PLLC (57) ABSTRACT

Embodiments of this invention relate to a method of determining the risk of driving a vehicle on a road network as a function of, for example, location, time of driving, weather, road conditions, driver ability, and traffic density. Historical information for the above is statistically analyzed to come up with a predictive model. Results can be displayed or presented to a driver while driving or otherwise or another person.

20 Claims, 6 Drawing Sheets

Related U.S. Application Data (60) Provisional application No. 62/037,924, filed on Aug. 15, 2014.

(58) Field of Classification Search
USPC .......................................................... 701/423
See application file for complete search history.

(56) References Cited

U.S. PATENT DOCUMENTS

| | | | | |
|---|---|---|---|---|
| 6,333,703 | B1* | 12/2001 | Alewine | G08G 1/096775 340/995.13 |
| 6,415,226 | B1* | 7/2002 | Kozak | G08G 1/096888 701/410 |
| 9,020,751 | B1* | 4/2015 | Bogovich | H04W 4/024 701/410 |
| 2001/0020902 | A1* | 9/2001 | Tamura | G01C 21/3697 340/936 |
| 2002/0111725 | A1* | 8/2002 | Burge | G07C 5/008 701/31.4 |
| 2007/0216521 | A1* | 9/2007 | Guensler | G08G 1/096775 340/936 |
| 2008/0319652 | A1* | 12/2008 | Moshfeghi | G08G 1/0969 701/532 |
| 2010/0238009 | A1* | 9/2010 | Cook | G07C 5/00 340/439 |
| 2012/0232787 | A1* | 9/2012 | Kunath | G01C 21/3461 701/410 |
| 2015/0312655 | A1* | 10/2015 | Balakrishnan | G01C 21/166 340/870.07 |
| 2016/0189303 | A1* | 6/2016 | Fuchs | G06Q 40/08 705/4 |

OTHER PUBLICATIONS http://www.cepasafedrive.com/en/solutions/services_finder/13; "Route Hazard Mapping"; CEPA (0155) 9000 2088 Blvd. Mario Pani 400 Cuajimalpa de MorelosLomas de Santa Fe, Ciudad de Mexico CP 01219, Mexico-D.F. Accessed on Sep. 1, 2015.

http://www.drivermetrics.com; DriverMetrics; The Science of Safety; from a2om international ltd., Ramsden Grange, Hambledon Road, Busbridge Godalming, Surrey, England, GU7 1XQ; Accessed on Nov. 11, 2015.

Petty, Kevin et al., "Weather Applications and Products Enabled Through Vehicle Infrastructure Integration (VII) Feasibility and Concept Development Study", Jan. 2007, Prepared by National Center for Atmospheric Research, Report No. FHWA-HOP-07-084; pp. 1-119.

* cited by examiner

DETERMINATION AND DISPLAY OF DRIVING RISK

CROSS REFERENCE TO RELATED APPLICATIONS

This application claims priority to U.S. Provisional Application 63/037,924 filed on 15 Aug. 2014 which is herein incorporated by reference. This application is related to PCT/IB2014/001656 published under WO/2014/207558.

FIELD OF INVENTION

This invention relates to determining a risk index for driving a vehicle and displaying the risk index on a map of a transportation network or along a proposed route of travel.

BACKGROUND

Currently navigation devices or navigation applications on a general purpose device have the ability to display real-time traffic information superimposed on a map. In addition, individual incidents such as accident or road construction can be displayed as icons on a map. This can facilitate avoiding traffic by moving to a route that has less traffic or avoiding particular incidents. There is a need to perform a similar function but to chart the overall risk of driving. However driving risk can come in a variety of forms and how to display driving risk is problematic. The driver's ability to respond to risky conditions also vary and contribute to the risk.

Real time information (while driving) is very relevant to risk. For example, if the road is icy, the likelihood of being in an accident is potentially higher.

With a dynamic risk indexing system that is continually updated and also has real-time inputs, it is further possible to compel drivers to adjust driving habits based on the real-time information and the driver's historical driving habits to reduce the risk. For example, if a particular route is known to be icy, and the course the driver is taking is being monitored, and the monitoring system further suggests an alternate non-icy route, then the driver can avoid risky conditions. Alternatively if the driver has exhibited lack of vehicle control in driving at the current speed in similar conditions, then the monitoring system can suggest that the driver slow down to a safe speed.

Real-time information can come from a variety of sources such as wireless acquired weather information and traffic reports. This information can further be statistically aggregated to produce historical weather/traffic risk information likelihood indices that are spatially and temporally indexed. Metadata associated with the historical information can then be used to cull older information and continually update the indices with the latest information. Also continuous, real time, accumulation of accident reports with root causes can be helpful to access and distribute that risk across the total driving space of some geographic region. In addition, the driving behavior of an individual driver when driving under specific conditions can be monitored and factored into the risk.

Glossary

Transportation Network: A system of road, streets, paths, sidewalks, trails, waterways or other ways that a vehicle or pedestrian travels along. A transportation network can be subdivided by the type of vehicle or pedestrian that is intended to be used for. For example, roads and streets may be used by cars, trucks and busses. Trails and sidewalks may be used by pedestrians and perhaps bicycles. Transportation networks are generally stored in a Geographic information System that documents the location and interaction of various components of the transportation network. Attribution is also associated with the various components of the network.

Element: Is a distinct component of a transportation network that has an associated geographic coordinate/s. Examples of elements are road segments where the road begins and ends at an intersection; or an intersection between two or more roads.

Attribution: Attribution associated with a transportation network includes any piece of information that can be related to a spatially referenced element or component of the transportation network. Examples are such things as speed limits, number of lanes, connections between components, or type of vehicle that can traverse the component. Attribution, in addition to being spatially referenced may have a temporal (time) component expressed as, for example, time of day, time of week, or time of year. An example of this is the speed limit in a school zone.

Metadata: Metadata is a special kind of attribution associated with the quality of components of transportation network. Metadata can be associated with individual geographic components, attribution or the source of the geography or attribution. Metadata may be associated with precision or accuracy of the components or source. Metadata may have a component that list the age of the source material or the attribute or geometry.

Index: One or more values used to multiply or otherwise adjust up or down a baseline value. For example, if a prospective insured base premium is $100, discounts and/or increases to the base may be applied by multiplying the base by a crash index, a driver age index, a safe driving index or a single index that is based an aggregate analysis of a number of parameters.

Parameters: Any factor that may be directly or indirectly be related an index or outcome, for example, insurance risk.

Multivariate Analysis: A class of statistical analysis used to determine the relevance of one or more parameters in predicting an outcome and used to build a predictive function base on one or more of the analyzed parameters. In this case the outcome is the prediction of insurance risk.

Accident Count: The number of accidents that occur for a given element of the transportation network over a given time. This may be further subdivided based on weather conditions and/or time of day, time of week or based on other attributes that may influence accident occurrence.

Incident: A single occurrence of a measured parameter. For example an individual accident report is an incident of the parameter accidents; a recorded speed of an individual driver along a segment of road is an incident of speed of travel for that segment.

Granularity: This term is used to refer to the specificity of either an attribute or index. For example, if an accident count is based simply on the transportation element it took place on, it is less granular than if the accident count is based on the location (element) and the time.

Driving Risk (or Hazard Index): This term is used collectively for all embodiments of the present invention to encompass the desired outcome of a driving risk model. Examples of desired output is the probability of: having an accident at a given location or the probability of sustaining vehicle damage and bodily harm while driving and the anticipated severity of the damage or harm.

Driving Risk Attribute: Any information that may correlate statistically or as part of a multivariate analysis—to driving risk.

Crowd Sourced: Information that is gathered from voluntary (or otherwise) information that is contributed to a website or webservice via an internet link. This information can be anything from verbal reports concerning traffic, to GPS tracks that observe a drivers location and speed in real-time, which can then subsequently be used to update maps and other information pertaining to traffic or hazard.

Below are examples of elements of a driving risk database. Some or all of these elements may be used to develop a risk model or risk indices.

Standard GIS road network including:
  Road Segments
    Geography typically stored as a series of end nodes locations, and a series of shape points (internal points that define the location of the segment) or as a geometric function.
    Attributes Stored relative to a node or the segment as a whole
    (Road segments typical have an end node at the intersection with another road segment or a political boundary or a geographic feature.)
  Intersections
    Geography may be stored as either a singularity or a series of point and lines which make up a complex intersection (such as a highway cloverleaf)
    Attributes are stored that are associated with the intersection and/or the connecting segments
  Maneuvers (including complex maneuvers)
    Geography usually stored as a reference to one or more geographic components that make up the maneuver
  Attribution Examples (all attributes may have multiple values base on time and may also have metadata associate with them):
    For Segments:
      Speed limit/Actual Speed Driven
      Accident Count
      Historical Traffic Flow/Count
      Historical Weather Information
      Number of Lanes
      Vehicle Type Access
      Street Side Parking
      Elevation/Change in Elevation
    Railroad Crossing
    Political Boundaries
    Parking Areas
Historical Data
For a given transportation segment and for each accident event on that segment
  type of accident (solo or collision);
  direction of travel;
  date,
  time of day;
  type of vehicle;
  weather;
  driver record;
  type of tires/condition;
  cost of damage;
  number of passengers;
  injuries sustained;
  road conditions;
  traffic conditions;
  lane closers;
  the weather includes
    type and amount of precipitation;
    dewpoint;
    wind: speed and direction;
    smoke;
    fog;
    flooding;
    temperature;
    barometric pressure
  For an individual driver:
    Speed associated with a given time and location (that can then be associated with other variables such as weather and road conditions)
    Risky driving behavior, for example: driving over the speed limit; veering out of a lane, erratic speed; and sudden braking

BRIEF SUMMARY OF THE INVENTION

Embodiments of the present invention include a method to develop a database comprising parameters that are related to driving risk to be used for display and routing of a vehicle, where the parameters are related to transportation network elements and/or the individual driver's driving characteristics.

Embodiments of the invention include determining which parameters or combination of parameters best predicts driving risk for individual drivers. These parameters may vary geographically for example, rural vs. urban and due to an individual driver's historic driving behavior Embodiments of the present invention include a maintenance and update method for the above mentioned databases.

A system that comprises a database, software and hardware to predict driving risk and display it for the driver of a vehicle is included in embodiments of this invention.

It is an object of some embodiments of this invention to display driving hazard relative to transportation segments on a map of a transportation network.

It is an object of some embodiments of this invention to display the anticipated driving risk along a route to be traveled based on historical data and real-time data and to depict the anticipated risk for the anticipated time of day and/or day of week based on the relative historical information at specific locations along the route.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF THE FIGURES

Figure 1:
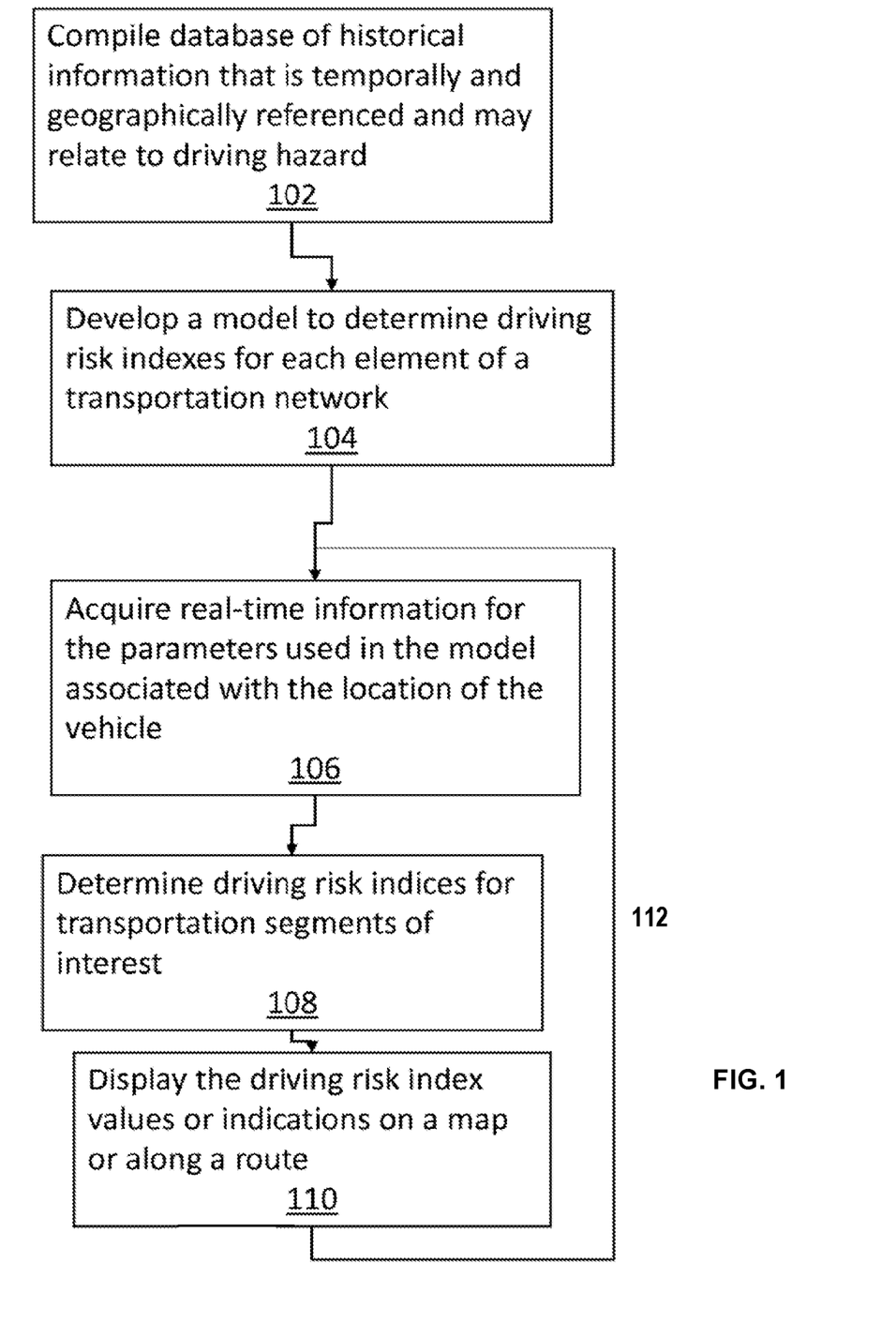
FIG. 1 is an embodiment of the present invention depicting a method to determine and display driving risk.

FIG. 1 describes a method to determine and display driving risk. The first step is to compile a database 102 of factors (historical information) that may be indicative of driving risk either singly or when used in tandem with other factors. The factors should be geo-referenced or indexed to transportation elements and optionally be temporally indexed as well. For example, attribution associated with the factors could be time or day or time of week. Factors that may be important for modeling risk are described below.

Once a database is compiled, a statistical model is developed 104 such that given input concerning factors used in the model, a probability of being in an accident can be determined.

The model can then be used with real-time information 106 acquired in the vicinity of the location of a moving vehicle or within a defined map area or along a proposed route. The model then generates risk indexes (probability of being in an accident) for each transportation segment of interest.

Finally the risk indices are displayed on a map or other graphical indication of risk 110. The process of acquiring real-time information, calculation risk, and displaying is repeated at intervals 112, in order to keep the risk display current with the latest risk factors.

Figure 2:
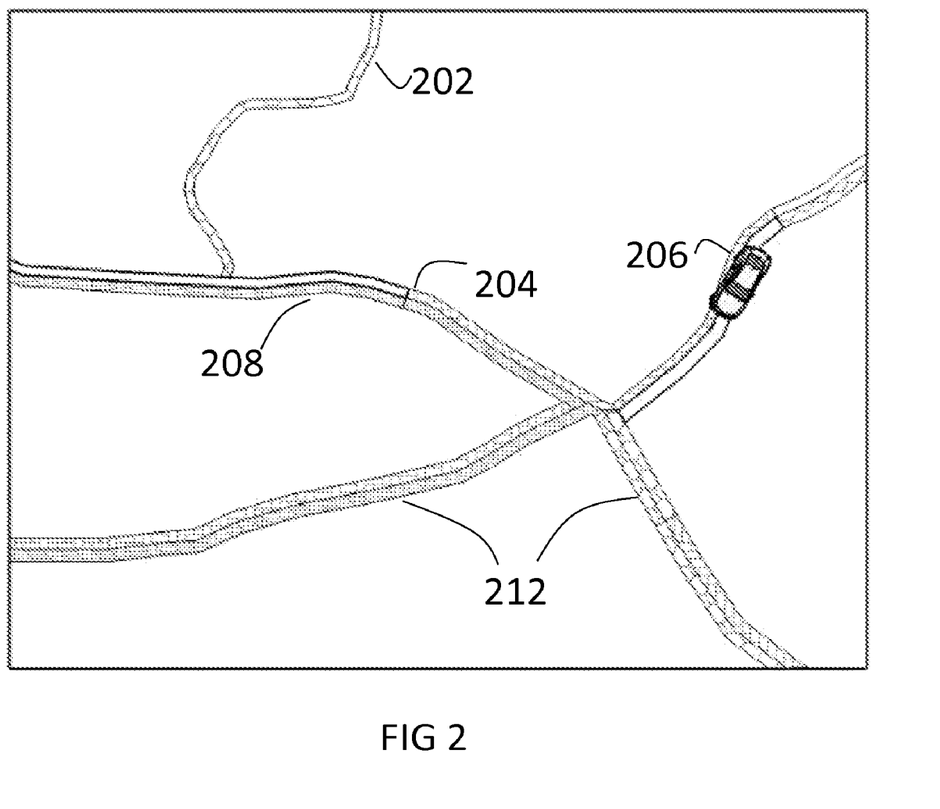
FIG. 2 depicts an embodiment of a driving hazard map.

FIG. 2 show one example of a hazard map. In the embodiment, transportation segments are depicted with superimposed indications of hazard: one segment with a single lane 212 (hazard data that is not distinguishable via direction of travel) and with two lanes 208. Various forms of stippling 212 depict various levels of anticipated hazard. As the hazard index can change from one transportation segment to the next, a change in the index may be noted at the junction of two transportation segments 204. In some embodiments, the present location of the vehicle in motion can be depicted on the map with some form of icon 206. Stippling or patterns 212 are just one form of representation of risk. Other forms include color coding or icons near each transportation segment (not shown).

Figure 3:
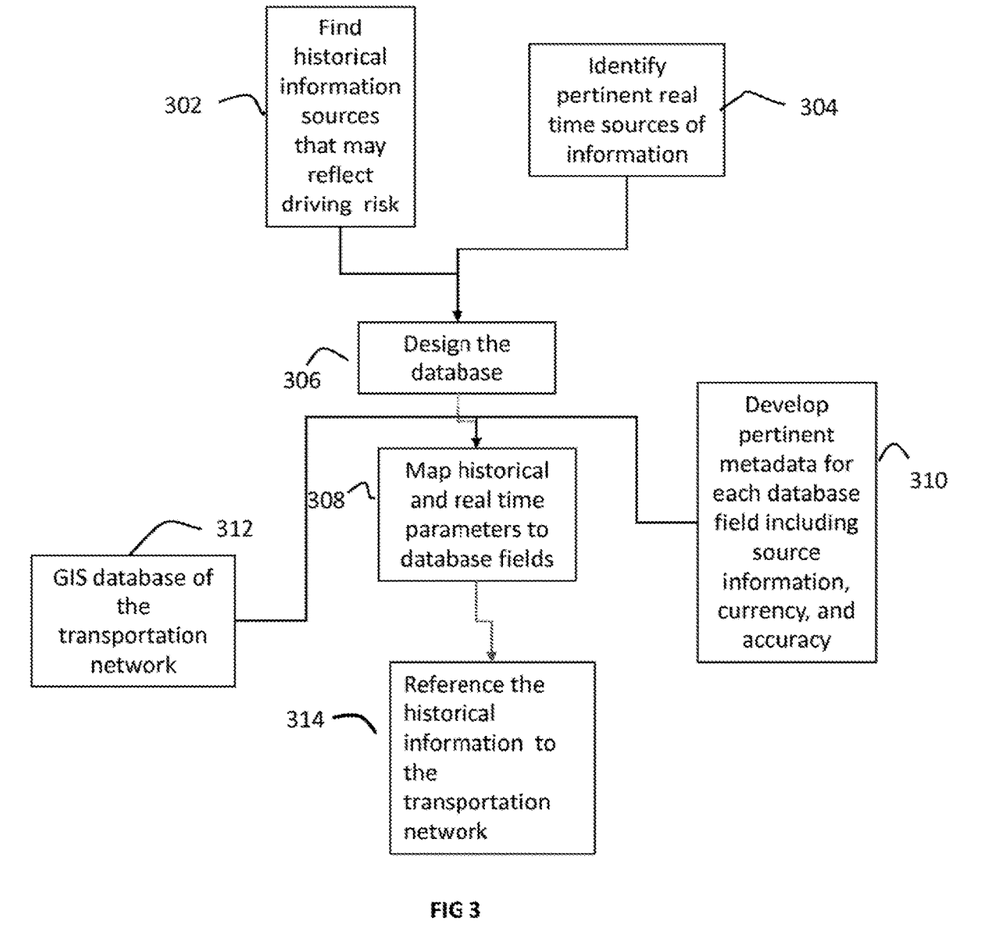
FIG. 3 is a flowchart of an embodiment showing how to initially develop a historical driving risk database.

FIG. 3 shows one method of how to initially construct a spatially referenced database, to be used to predict driving risk, based on existing historical information. A database of historical information is needed in order to a mass hazard information based on time and location. Different information may be available for different locations. The development of the database assumes no strong correlation between any parameter and risk. For example there may not be a strong correlation being driving over the speed limit and getting in an accident, however as a whole, driving faster may correlate to increased damage or harm if an accident occurs.

It is not presumed that relationships between parameters and risk hold true over large areas—there may be locally relevant predictors that are not as significant as in other areas. Certain historical datasets or parameters may not be as readily available in some areas as they are in others. For example, reports documenting accidents and accident locations may be more readily available and more easily input into a database for an urban area than for a rural area. Or accident reports may not be available, but traffic counts which may indicate accidents may be available.

Ideally the attribution used for driving risk will be easier to deal with if it is consistent throughout the entire rating area. To accommodate this, it may be necessary to approximate a parameter stored in the database with input from a related parameter. For example, from the previous paragraph, you may wish to store accident occurrences associated with each road segment. If accident reports are not available for an area of interest but traffic flow information is, you may be able to infer that while traffic stops or slows way down that this is caused by an accident. This could then be reflected as an accident occurrence. This inferred accident occurrence could further be reflected in the metadata as the source for the accident count and an indication that the count is less reliable than an actual accident count. Another means of getting the proxy is the road quality, like road maintenance, and quality of the road surface type.

Accordingly as shown in FIG. 3, the first step 302 is to find sources of historical information that potentially can be used singly or in tandem with other parameters to predict driving risk. As pointed out above, the sources of information may vary locally, but it will be necessary to combine or map 306 the information from different sources that represent the same parameter into a single index.

Real-time information pertinent to driving risk needs to be identified 304. Real-time information could come from insurance subscribers that opt into an insurance plan that mandates monitoring or could be crowd sourced by volunteers. Additionally real-time information could come from sources such as commercial traffic information providers or local government highway or police departments.

Based on what historical information that is available and what quantity there is and what type of real time information can be acquired, the database schema or design can then be created 308. All parameters to be stored in the database will be geographically referenced 314 relative to an underlying GIS database 312 of the transportation network. Certain parameter (for example a speed limit) may also be temporally referenced.

Once a risk system is running based on the database, some of the data in the database may be retired based on age or when more accurate information becomes available. Therefore metadata about the age and quality of the data needs to be documented 310.

Figure 4:
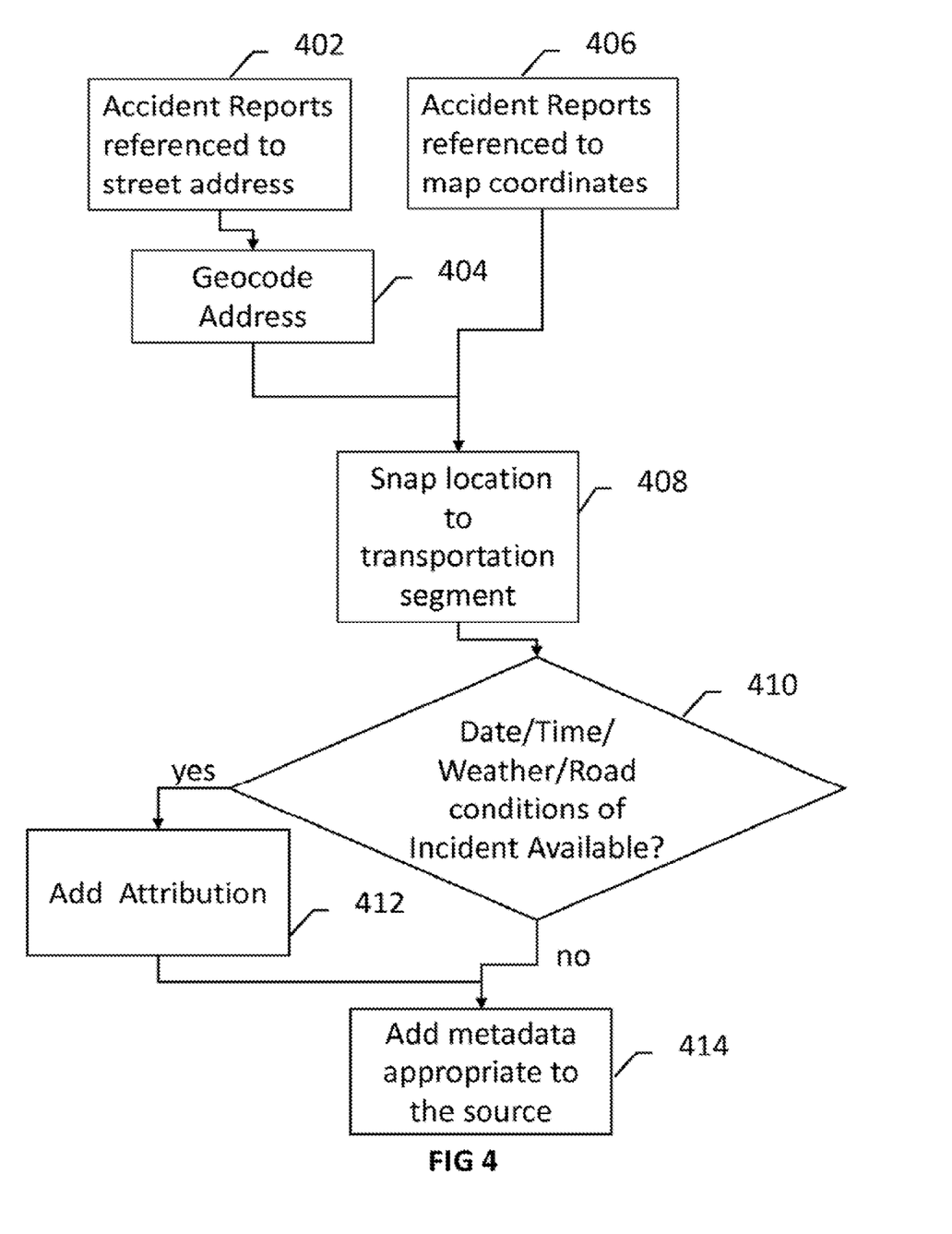
FIG. 4 is depicts an embodiment of how to combine risk information from disparate sources.

FIG. 4 shows an example of how disparate information is combined into a single layer in the risk database. The example is given for accident reports but the technique also applies to any type of attribution. As accident reports initially come from local police departments and/or directly from insurers, the format of the information and availability varies between departments or companies. For example, one department will have available accident reports that are geographically referenced to a street address or an intersection 402 and another department will have accident reports referenced to geographic coordinates 406, for example, latitude and longitude. In an embodiment of this invention, risk attribution is referenced to components of the transportation network, for example street segments or intersections, with possibly also direction of travel. Therefore the frame of reference of the incoming accident reports need to be translated into the frame of reference of the database. For accident reports geographically referenced to a street address or intersection 402, the reference must be geocoded 404 so that the segment or intersection can be associated (snapped) 408 with appropriate road segment or intersection in the database. If the incoming accident report is referenced to map coordinates 406, then this location can simply be snapped 408 to the nearest street segment or intersection.

As is well known, the probability of an accident will increase with increased traffic density and/or due to inclement weather. This information may be available 410 with incoming accident reports or may be available via other sources such from a weather service which then can be related to an accident incident via location and time.

The probably of an accident may increase based on the time. For example the probability of an accident most likely increases at 2 AM (2:00) on New Years day as opposed to any other day at the same time. Therefore any form of attribution that can be associated with an incident should be added 412 so that it can be analyzed to see if there is any correlation with risk.

The granularity of associated information will vary. For example if a traffic flow was associated with a particular accident and that traffic flow information was acquired from a Traffic Messaging Channel (TMC), this information may not be associated with the exact location of the accident and therefore may be suspect. The quality of the associated attribution for accident reports needs to be documented as metadata 414.

It should be noted that initially accident reports (and other parameters) would come from historical data such as police reports, however, this could be supplanted by real time information coming from vehicle sensors. For example, if a system can access the output from car sensors, an accident incident could be recorded at the GPS location of the vehicle when there was signal indicating that the air-bag was deployed. Once again the source of the report or parameter should be included as part of the metadata and be used as a measure of quality. Other driving telemetry obtaining devices which may be installed on the vehicle would be used to obtain additional pertinent information.

Examples are shown below of incidents that can be recorded in a risk database and which can subsequently be used to determine driving risk. Examples of associated attribution are also provided. These are examples only and is not an exhaustive list.

Accidents

Crime

Tickets

Vandalism

Insurance Payout; Fault (victim or perpetrator)

Road Condition (Potholes, pavement temperature, lane marking, etc.)

Road Surface Type

Traffic Counts

Weather Events (Ice, Snow, Rain, Fog, Smog, Temperature)

Driver Distracted? Also visibility of curves, signs, traffic lights, warning signals Traffic Flow Volume of Traffic Speed of Traffic/Excess Speed Lane Closures Detours Related Accidents The following list are examples of information that may be recorded for an individual driver and may come from either/or questionnaires or real-time sensor information: Type of car; where you drive; when you drive; snow tires during winter; previous tickets Real-time tracking allowed by the vehicle driver?

GPS, bluetooth usage (i.e. cellphone); rapid acceleration; braking; airbag deploy; speed; other driving telemetry devices installed in car (accelerometer, gyroscope, compass)

Air Bag Deployment

Rapid Acceleration/Deceleration

Swerving from lane Segments and intersections traversed including time of day; time of week; speed; braking; acceleration; lane changes; crossing the median; bluetooth usage Stopping locations; duration Associated weather Once a historical database of incidents, for example, accidents and traffic violations is developed and referenced to transportation elements, then analysis can be performed to determine relationships to risk. Once again, no a priori assumptions are made about a correlation between a particular parameter and risk other than initial assumptions that are made to run and test a multivariate model.

In an embodiment, incidents are evaluated based on the quantity and quality of information available and also the extent over which the information is available. The goal is to create a risk and/or hazard index or indices based on one or more of the type of incidents recorded related to elements of the transportation network.

In an embodiment, what is desired, is a function to predict the likelihood that a driver will be involved in an accident. The likelihood of being in an accident can be a function of:

Time

Location (for driving and parking)

Driver Performance

Road Conditions

Weather

Traffic Volume

Crime Statistics

Type of Vehicle

Number of passengers

Vehicle condition

These parameter can be further broken down into:

Time: time of day, time of week, time of year, holidays; daylight/nighttime

Location: relative to a transportation segment, geographic location, within a political boundary Driver Performance:

If monitored using in-vehicle sensors while driving: amount of distraction (mobile use); driving above or below speed limits; weaving; rapid acceleration; road class usage; and duration From records: accident reports; speeding and other violations Road Conditions:

From records: potholes, sanding/salting during storms; plowing frequency; number of police patrols; visibility issues (like proper lighting at night, or blinding sun in eyes)

From vehicle sensors: bumpiness; storm conditions; ABS braking engaged; differential slip The factors that may influence the risk of being in an accident may be exceedingly complex. This is why the analysis lends itself to a form of multivariate analysis. Typically a human can only visualize the relationship between 2, maybe 3 variables at a time and a parameter my not be directly related to a cause of an incident, but may provide an indication of the cause. For example in one area, it may be found that the instance of traffic accidents at 2 AM is far greater than in another area. Therefore you could conclude that time of night is not a very good overall predictor of having an accident. However if you also observe that in the first area, the instance of arrest for drunk and disorderly is higher than the second area, the combination of time and arrests for intoxication, may be a much better predictor. If yet more variables are introduced, then the relationship may get more complicated and more poorly understood without some form of multivariate statistical correlation.

In another example the quality of the information will influence the predictive model. It is well known that ice formation on a road is a function of temperature, humidity and barometric pressure. However if the weather conditions in an accident report are based on the general weather conditions for the region from a weather report, this data will not take into account, subtle weather variations that may be available from in-car sensors. A difference of a degree in temperature could make the difference between ice and no ice.

Figure 5:
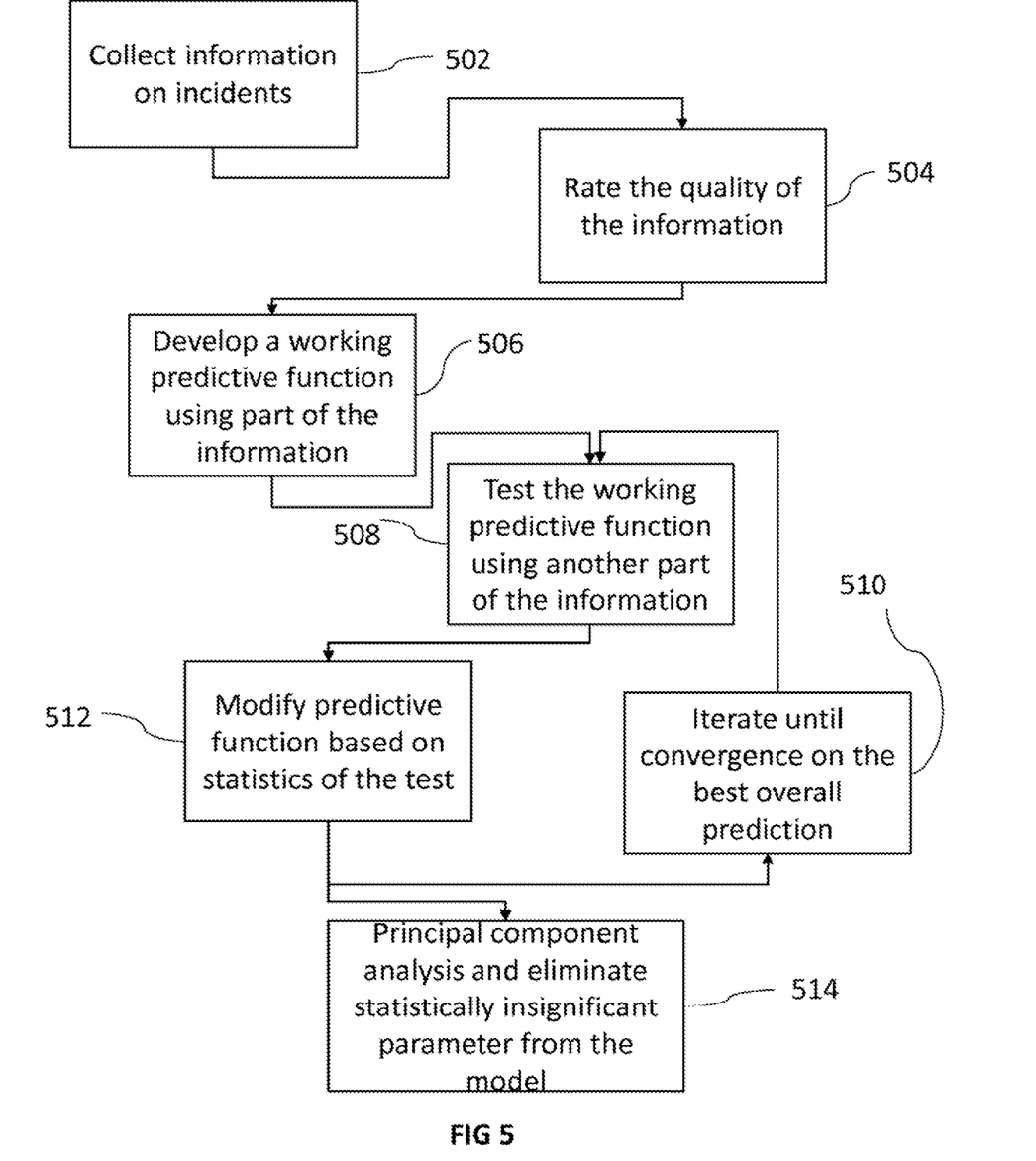
FIG. 5 is generic flowchart of multivariate analysis and model development.

As shown in FIG. 5, once an initial database is constructed 502 with some or all of the above listed information, then a predictive model needs to be developed. When collecting data, care must be taken to not duplicate the same incident that is recorded in multiple sources. A statistical significance of the measurement parameters needs to be evaluated with respect to driving risk 504. For a given geographic area, it must be ascertained whether or not there is enough data to make a meaningful correlation and whether that data is of sufficient quality. If the data is of mixed quality, as in the freezing pavement example above, then quality must be taken into account for the overall general model. This can be done by setting a minimum threshold data quality where a dataset must contain quality data for a specified percentage of the transportation elements within the region of interest.

It is desirable to have as much granularity in the observed information as possible in order to determine what information correlates more strongly to risk. Using the accident report example, we want to predict driving risk. A model can be developed that uses part of the information available as a training set 506 (for example in a neural network predictive model known in the art) and part of the data to test the prediction 508.

In many multivariate analysis methods, initial assumptions need to be made to come up with a working predictive function 506. For example, initial weighting or correlation values might need to be assigned to the input variables. An educated guess may be that the number of pot holes in a road is about half as important to risk as the number of drunk driving arrests.

Once an initial model is generated, an iterative process 510 is used to converge on a reasonable predictive model. This is done by modifying the weighting of input parameters slightly 512, then rerunning the new predictive function and observing the correlation statistics until an optimal correlation is arrived at. In embodiments, this can be done automatically or manually.

In an embodiment, the input for a model may need to be parameterized in such a way as it can be used in the model. An example of parameterization would be to characterize incidents into a grouping. For example, it may be desirable to collectively refer to accidents counts falling into a range of 1-10 accidents per year as a "low" accident count and have "medium" and "high" counts as well.

Figure 6:
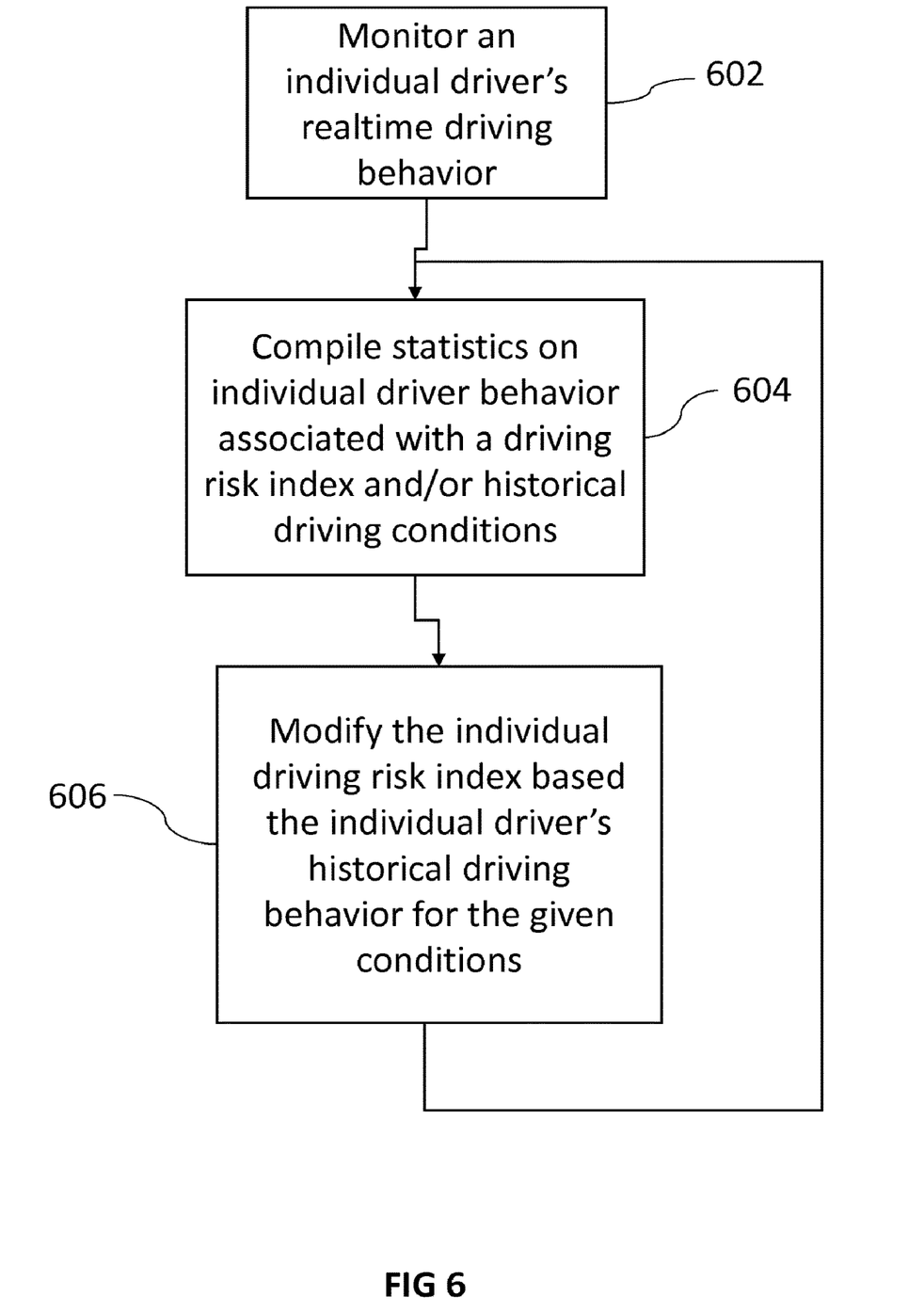
FIG. 6 is a flow chart of how a hazard index may be effected by an individual's historical driving behavior.

In some embodiments, the driving risk index may be modified for an individual driver based on their historical driving behavior relative to where they have driven and what either the hazard index was or what the driving conditions were like as depicted in FIG. 6. Provided a driver allows it, the driver's driving behavior is monitored 602. A database of driving behavior for the individual is established which compiles the driving characteristics relative to the driving risk index and/or driving conditions at the time of driving and the location of driving 604. For example, if the driver consistently exhibits exceeding a safe driving speed during hazardous conditions, this could indicate that the driver's likelihood of losing control and/or being in a accident is enhanced and therefore the driving risk index as displayed or used for routing calculations should be increased 606 for this particular driver. The statistics are continually compiled, and if the driver improves over time, this can also be observed and be incorporated in future analysis, for example, for insurance rates or individual driving risk indices.

As was previously pointed out, the parameters that could be used to driving hazard and the resulting model could be exceedingly complex. Compiling information from a variety of sources to populate a given parameter may be difficult and if available data is insufficient, may also result in a poor prediction. Therefore, in order to keep the cost of the risk system low and to facilitate rapid development, it may be desirable to limit the data/parameters that are utilized and make some simplifying assumptions.

In an embodiment, the assumption is made that risk for driving on a particular transportation element is directly correlated to the number of accidents reported on that element over a set time period. Therefore the risk database could simply contain accident incidents that are related to individual transportation segments. If available, additional attribution that may be recorded with accident incidents are, for example, direction of travel, time of day, date, and weather variables.

Another embodiment comprises assembling an accident incident database and linking accidents incidents to transportation elements 402. If any additional information is available such as the time of accident, the severity of the accident, the weather or pavement conditions, this should be included as associated attribution. Based on the incident information, an accident count could then be developed which, in its simplest form, would be the average number of accidents that occur on each transportation element over a given time period. If other attribution is available, then the accident count could be further subdivided based by separating data, for example, for a given time of day or time of week, and direction of travel, thus having multiple accident counts per transportation element. If severity information was available, then accident incidents could be weighted in the accident count, for example, an accident with a fatality could be counted as 10 times a minor accident.

A basic Hazard Index (I) (also called a driving risk index) can be developed. In its simplest form, the Hazard Index is the summation of the accident for each transportation element for a given time period.

Yet more refinement of an individual Hazard Index could be made by further subdividing the index based on additional attribution such as weather and road conditions provided that the accident count database has this amount of granularity.

If a route is being taken, the system next looks for real-time information from external sources of information—for example traffic counts, accident reports or reports of lane closures. In addition, weather information along the route could also be acquired.

In an embodiment, while following a route, risk or hazard conditions could be monitored in real-time and the route altered on-the-fly if conditions change and another route is faster or safer.

System Implementation

The method/s described in this application can be implemented on a Vehicle Navigation System. The vehicle navigation system comprises one or more of:
  a. A database module containing attribution associated with transportation elements and times that is housed in a database management system.

b. A driver behavior module containing attribution associated how well an individual driver drives in relationship to driving conditions and driving risk indices. housed in a database management system that may or may not be separate from the database module in item a.

c. A compilation module which can be implemented in software running on a computer processor which performs statistical analysis to determine vehicle driving risk indices based on the attribution in the database module and from external sources of information.

d. A display module, for example, which can be a display screen, which in turn is housed on a mobile device, a computer, or a personal navigation device or an in car navigation device or infotainment system.

e. Sensors modules to acquire attribution associated with risk, vehicles, drivers and the transportation network.

f. Wired or wireless communication modules functionally connecting the various other modules.

All modules can be part of the same device or separate devices and there can be more than one device that containing each module which work in parallel or in series.

Instructions to perform the various task can be stored on volatile or non-volatile memory in communication with computer processor/s.

What is claimed:

1. A method, implemented using a vehicle navigation system, for determining the risk associated with driving on a plurality of elements of a transportation network by a driver comprising:
   compiling, in a compilation module of the navigation system, a database of temporal and geo-referenced driving risk attribution types for the plurality of transportation elements, for a plurality of drivers and vehicles;
   determining, in a risk determination module of the navigation system that is functionally connected to the compilation module, one or more driving risk indices for each of the plurality of elements that relates at least to one of the driver risk attribution types to the likelihood of damage to at least one of a person and property and optionally to the probable severity of damage of the person and property.

2. The method of claim 1 further comprising:
   displaying, in a functionally connected display module of the navigation system, the driving risk indices for a plurality of transportation elements for one of: within a mapped area or, in the vicinity of a route to be traveled or being traveled or, in the vicinity of the present location of a moving vehicle.

3. The method of claim 1 wherein the driving risk attribution types comprise at least one of the following associated with each of a plurality of accidents:
   location;
   time;
   transportation element;
   severity of damage and injury;
   weather;
   traffic;
   speed of travel for each vehicle in each accident prior to the accident;
   speed limit of the transportation segment;
   road condition;
   individual vehicle characteristics for each vehicle in the accident;
   identification of the driver and driving record for each vehicle in the accident; and
   lane closers.

4. The method of claim 2 wherein the display of the driving risk indices is a color coding relative to the amount of risk superimposed on the representation of the transportation elements.

5. The method of claim 2 wherein the indication of the driving risk indices is one or more icons placed in proximity to the associated transportation element wherein at least one of the shape and color of the one or more icons represents relative risk.

6. The method of claim 1 wherein multiple driving risk indices are calculated: one for each driver risk attribute type and one for all driver risk attribute types statistically combined.

7. The method of claim 6 wherein a user can select which index to use and display.

8. The method of claim 2 wherein the display of driving risk flashes on and off if the risk is above a specified threshold.

9. The method of claim 1 wherein a message is one or more of displayed and annunciated if all routes away from a current or a selected location have a driving risk index greater than a specified threshold, indicating it is unsafe to drive.

10. The method of claim 2 wherein for a selected or present location of a vehicle, a safe driving speed is displayed in a corner of the map display.

11. The method of claim 1 wherein the driving risk index indicates the maximum safe driving speed for the given conditions.

12. The method of claim 1 wherein the indications of the driving risk index indicate the maximum driving risk index given any conditions or times.

13. The method of claim 2 wherein the display of driving risk indications is periodically updated with real-time information.

14. The method of claim 1 wherein only safe route are displayed wherein a safe route has all transportation elements that make up the route, below a minimum threshold driving risk rating.

15. The method of claim 1 wherein at least in part the driving risk indices are based on the mean of the driving ability of a plurality of drivers during specific driving conditions and for a specific driver, the driving risk indices are modified based on whether the driving ability of the specific driver is above or below the mean.

16. The method of claim 15 wherein the driving risk indices for the specific driver are utilized to compute an insurance cost for driving.

17. The method of claim 1 wherein a multivariate analysis is used to determine the driving risk indices.

18. The method of claim 1 wherein individual datum of the driving risk attribution have associated metadata indicating the age of each datum and wherein the datum are deleted after the age reaches a specific threshold and the driving risk indices are recalculated.

19. A vehicle navigation system, for determining the risk associated with driving on a plurality of elements of a transportation network by a driver comprising:
   a compilation module configured to capture and store in a database, temporal and geo-referenced driving risk attribution types for the plurality of transportation elements, for a plurality of drivers and vehicles;
   a risk determination module, functionally connected to the compilation module, configured to generate, one or more driving risk indices for each of the plurality of transportation elements that relates at least to one of the driver risk attribution types to the likelihood of damage to at least one of a person and property and optionally to the probable severity of damage of the person and property; and a display module, functionally connected to the compilation and risk determination modules, configured to display the driving risk indices for a plurality of transportation elements for one of: within a mapped area or, in the vicinity of a route to be traveled or being traveled or, in the vicinity of the present location of a moving vehicle.

20. The system of claim 16 wherein at least in part the driving risk indices are based on the mean of the driving ability of a plurality of drivers during specific driving conditions and for a specific driver, the driving risk indices are modified based on whether the driving ability of the specific driver is above or below the mean.

* * * * *